(12) United States Patent
Tominaga et al.

(10) Patent No.: US 6,372,340 B1
(45) Date of Patent: Apr. 16, 2002

(54) COATING COMPOSITION FOR FLOOR COVERING

(75) Inventors: Yoji Tominaga; Nobuo Yamamura, both of Aichi (JP)

(73) Assignee: GEN Maintenance Technoloy Inc., Tsushima (JP)

( * ) Notice: Subject to any disclaimer, the term of this patent is extended or adjusted under 35 U.S.C. 154(b) by 0 days.

(21) Appl. No.: 09/534,004

(22) Filed: Mar. 24, 2000

(51) Int. Cl.$^7$ ................................................. B32B 7/12
(52) U.S. Cl. .............................. 428/352; 428/355 EM; 428/355 R; 428/413; 427/457; 156/272.2
(58) Field of Search ........................ 428/352, 355 EM, 428/355 R, 413; 427/457; 156/272.2

(56) References Cited

U.S. PATENT DOCUMENTS 6,040,049 A * 3/2000 Tominaga et al. .... 428/355 EN
6,197,844 B1   3/2001 Hamrock et al. ........... 522/167

FOREIGN PATENT DOCUMENTS

JP         10067951 A   *   3/1998
JP         11077922 A   *   3/1999

OTHER PUBLICATIONS

Iwanami Shoten Co., Ltd. (pub.), Rikagaku Jiten (Physics and Chemistry Dictionary), 5$^{th}$ Ed., Partial Translation, Feb. 2000.

* cited by examiner

Primary Examiner—Leszek Kiliman
(74) Attorney, Agent, or Firm—Oblon, Spivak, McClelland, Maier & Neustadt, P.C.

(57) ABSTRACT

The present invention provides a coating composition for the surface of floor covering, by which the deterioration of surface gloss caused by walking thereon hardly occurs, colored dirty resulting from lard and process oils is minimized and the colored dirty can be easily removed by e.g. polishing, a floor surface-coated body coated therewith and a process for producing the same, as well as a composite film capable of forming a resin coating film excellent in gloss retention.

The present invention relates to a coating composition applied onto the surface of floor covering. The coating composition comprises a photo-curing oligomer and a photo-initiator. The average number of functional groups per molecule of the photo-curing oligomer is 4 or more.

8 Claims, 3 Drawing Sheets

COATING COMPOSITION FOR FLOOR COVERING

BACKGROUND OF THE INVENTION

1. Field of the Invention

The present invention relates to a coating composition applied onto the surface of floor covering for retention of surface gloss, a floor surface-coated body coated therewith and a process for producing the same, as well as a composite film for forming a resin coating film excellent in gloss retention.

2. Description of the Prior Art

As floor covering in fast-food stores, convenience stores, department stores, gymnasiums, hospitals, offices, houses, factories etc., there are used i) resinous tiles and sheets such as vinyl chloride etc., ii) wooden materials such as wooden flooring, iii) ceramic materials such as porcelain tiles, iv) stone materials such as marble, and v) concrete materials such as mortar.

These kinds of floor covering can be used as such, but are usually coated with a polishing agent such as wax etc. for preventing surface deterioration, improving durability, and conferring gloss and non-slip properties. Further, the applicant proposed an invention of an aqueous coating for floor surface in order to reduce the cumbersome daily operation for floor maintenance by coating with a polishing agent or the operation of removing a polishing agent (Japanese Patent Application No. 248703/1996), as well as a composite film making the coating operation itself unnecessary (Japanese Patent Application No. 254347/1997).

However, even if the conventional aqueous coating for floor surface or the composite film described above is used, the floor surface gloss in a store is deteriorated in a few months after coating. Further, dirt including earth and sand, edible oils such as lard and process oils contained in a rubber sole of a shoe adheres to the floor surface and is remarkable. There are many cases where like a coating layer of a conventional polishing agent, the coating film should be removed.

SUMMARY OF THE INVENTION

In view of these problems in the prior art, the object of the present invention is to provide a coating composition for the surface of floor covering, by which the deterioration of surface gloss caused by walking thereon hardly occurs, colored dirty resulting from lard, process oils etc. is minimized and the colored dirty can be easily removed by e.g. polishing, a floor surface-coated body coated therewith and a process for producing the same, as well as a composite film capable of forming a resin coating film excellent in gloss retention.

The present invention relates to a coating composition applied onto the surface of floor covering, comprising a photo-curing oligomer and a photo-initiator wherein the average number of functional groups per molecule of the photo-curing oligomer is 4 or more.

The present invention was made on the basis of the new finding that the average number of functional groups per molecule of the photo-curing oligomer is related to the gloss retention performance of a coating film formed by curing said coating composition.

That is, in the present invention, the average number of functional groups per molecule of the photo-curing oligomer contained in the coating composition is 4 or more. The coating composition is applied onto the surface of floor covering, and upon irradiation with light, is linked and cured by the photo-initiator. A coating film capable of preventing deterioration of gloss is thereby formed on the surface of the floor covering.

Accordingly, the coating film formed from the coating composition of this invention hardly undergoes the deterioration of surface gloss by walking thereon and is excellent in the gloss retention performance. Further, colored dirty attributable to lard, process oils etc. is not remarkable.

The dirty on the coating film can be easily removed by e.g. polishing, and thus the operation of refreshing the surface of floor covering is easy. Removal of the coating film is also feasible or a coating film can also be formed thereon. It is also possible to repair flaws in the coating film.

Further, the daily cleaning method may be a very simple method. For example, the gloss of the surface of floor covering is restored by cleaning the coating film with a duster cloth, a dust-collecting brush or a suction-type cleaner, or by wiping it with a mop containing water or a neutral detergent. Accordingly, daily cleaning by a mechanical method using a polisher, a vanisher etc. is unnecessary, thus achieving a significant reduction in the maintenance cost.

Further, dirt adhering to the surface of the coating film can be easily removed by polishing it with a sand paper, an abrasive-containing compound or a cleanser, and so on. However, depending on a polishing method, there is the case where after removal of dirt by polishing, buffing should be conducted to restore the gloss.

That is, the coating film formed from the coating composition of this invention leads to a significant reduction in the total cost for floor maintenance.

According to the present invention, there can be provided a coating composition for the surface of floor covering, by which the deterioration of surface gloss caused by walking thereon hardly occurs, colored dirty resulting from lard, process oils etc. is minimized and the colored dirty can be easily removed by e.g. polishing, a floor surface-coated body coated therewith and a process for producing the same, as well as a composite film capable of forming a resin coating film excellent in gloss retention.

DETAILED DESCRIPTION OF THE INVENTION

The average number of functional groups per molecule of the photo-curing oligomer refers to the average number of functional groups contained in 1 molecule of the photo-curing oligomer. If plural types of photo-curing oligomers are used, the average number of functional groups is calculated from the average molecular weight of the photo-curing oligomers.

When 2 kinds of photo-curing oligomers are used, the average number of functional groups per molecule is calculated by using the average molecular weight, as follows: The average number (N) of functional groups per molecule is expressed as in:

$$N=\{(Wa/Ma) \cdot Na+(Wb/Mb) \cdot Nb\}/\{(Wa/Ma)+(Wb/Mb)\}$$

wherein the average molecular weights of two kinds of photo-curing oligomers are Ma and Mb respectively; the amounts of said oligomers added are Wa and Wb respectively; and the average numbers of functional groups per molecule are Na and Nb respectively.

If the coating composition contains a monomer, the average number of functional groups in the monomer is not contained in the average number of functional groups in the photo-curing oligomer. This is because the monomer blended does substantially not affect the gloss retention performance of the coating film although the monomer along with the photo-curing oligomer is subjected to curing reaction. The reason for this is possibly that the amount of the monomer blended is lower than the amount of the photo-curing oligomer.

The average number of functional groups per molecule of the above-described photo-curing oligomer is 4 or more. A coating film capable of preventing gloss deterioration can thereby be formed on the surface of floor covering. On the other hand, if it is less than 4, gloss may be deteriorated.

The average number of functional groups per molecule of the photo-curing oligomer is 5 or more, more preferably 6 or more. The effect of preventing gloss deterioration is thereby further improved.

The upper limit of the average number of functional groups per molecule of the photo-curing oligomer is preferably 15 to 20 or so. This is because the reactivity of functional groups is decreased with an increase in the number of functional groups per molecule and because it is difficult to provide the photo-curing oligomer having an extremely large number of functional groups by synthesis.

The above functional groups include an acryloyl group, vinyl group, methacryloyl group, allyl group etc. Among these, an acryloyl group is more preferable.

As the above photo-curing oligomer, it is possible to use at least one member selected from the group consisting of epoxy acrylate oligomer, alkyd acrylate oligomer, urethane acrylate oligomer, polyester acrylate oligomer, polyether acrylate oligomer, melamine acrylate oligomer, polybutanediene acrylate oligomer, polyol acrylate oligomer, silicon acrylate oligomer, unsaturated polyester resin and unsaturated (meth)acrylic resin.

These photo-curing oligomers are preferably in an aqueous emulsion system and/or an aqueous dispersion system. The aqueous emulsion system refers to the property of the oligomer to be dispersed and emulsified as droplets in water. The aqueous dispersion system refers to the property of the oligomer to be dispersed as particles in water.

The photo-curing oligomer in the aqueous emulsion system and/or the aqueous dispersion system neither smells upon coating drying nor requires an organic solvent for washing. Further, since its viscosity is generally low, an easy coating method using a brush, a roller, mouton, a mop and a spray is suitable.

Further, the photo-curing oligomer may be in an organic system or a non-solvent system. In this case, the removal of the solvent is not necessary or can be effected in a short time.

The photo-initiator described above, upon irradiation with light, initiates curing reaction of the photo-curing oligomer. The photo-initiator includes initiators of cleavage type, hydrogen-withdrawing type, and ion reaction type (UV·EB Curing Technology, page 152, Publishing Division in Sogo Gijutsu Center Co., Ltd., Japan (1982)), and any of these photo-initiators can be used.

The photo-initiator described above includes e.g. benzyl dimethyl ketal, 1-hydroxycyclohexyl phenyl ketone, 2-methyl-1-[4-(methylthio) phenyl]-2-morpholinopropanone-1,2-hydroxy-2-methyl-1-phenylpropane-1-one, 2-benzyl-2-dimethylamino-1-(4-morpholinophenyl)-butanone-1,1-[4-(2-hydroxyethoxy)-phenyl]-2-hydroxy-2-methyl-1-propane-1-one, bis(cyclopentadienyl)-bis(2,6-difluoro-3(pyl-1-yl)phenyl) titanium, bisacylphosphone oxide, 2,4,6-trimethylbenzoyl diphenyl phosphine oxide and benzoyl alkyl ether.

Further, there are benzoin methyl ether, benzoin ethyl ether, benzoin isopropyl ether, benzoin isobutyl ether, 1-(4-isopropylphenyl)-2-hydroxy-2-methylpropane-1-one, p-tert-butyl trichloroacetophenone, p-tert-butyl dichloroacetophenone, benzyl, benzoin, acetophenone and benzophenone.

Further, there are 1-phenyl-1,2-propanedione-2-(o-ethoxycarbonyl)oxime, 2-chlorothioxanthone, 2-methylthioxanthone, dibenzosuberone, 2,4-diethylthioxanthone, 2,4-diisopropylthioxanthone, 2,4-dimethylthioxanthone, 4,4'-dichlorobenzophenone, 4,4'-bisdimethylaminobenzophenone, 4,4'-bisdiethylaminobenzophenone, 3,3',4,4'-tetra(t-butylperoxycarbonyl)benzophenone, benzal acetone, biacetyl, α,α-dichloro-4-phenoxyacetophenone and 2-ethylanthraquinone.

Further, there are n-butyl benzoin ether, isobutyl benzoin ether, tetramethyl thiuram sulfide, azobisisobutyl nitrile, benzoyl peroxide, 3,3-dimethyl-4-methoxybenzophenone, methyl benzoyl formate, 2,2-diethoxyacetophenone, acyloxym ester, chlorinated acetophenone, hydroxyacetophenone, acylphosphine oxide, isobutyl thioxanthone, 4-N,N'-dimethyl acetophenone, acetophenone diethyl ketal, 4'-isopropyl-2-hydroxy-2-methylpropiophenone.

Further, there are methyl phenylglyoxylate, methyl o-benzoylbenzoate, methyl p-dimethylaminobenzoate, 2,2'-bis(o-chlorophenyl)-4,5,4',5'-tetraphenyl-1,2'-biimidazole, 10-butyl-2-chloroacridone, camphor quinone, 3-ketocoumarin, anthraquinone, α-naphthyl, acenaphthene, p,p'-dimethoxybenzyl, p,p'-dichlorobenzyl, 2,6-dimethyl benzoyl diphenyl phosphine oxide, benzoyl diethoxy phosphine oxide, α-chloroanthraquinone, 2-tert-butyl anthraquinone and bis(2,6-dimethoxybenzoyl)-2,4,4-trimethyl-pentylphosphine oxide.

These can be used singly or in combination thereof.

The proportion of the photo-initiator incorporated into 100 parts by weight of the photo-curing oligomer is preferably 0.01 to 10 parts by weight. The photo-curing reaction of the coating composition thereby proceeds effectively.

In addition to the photo-curing oligomer and the photo-initiator described above, a monomer, an additive or a solvent can be added as necessary to the coating composition of the invention.

The monomer is also called a reactive diluent and added generally to reduce the viscosity of the photo-curing oligomer solution, but may also be added to improve coating performance such as adhesion thereof to floor covering and flexibility.

Examples of such monomers include monofunctional monomers such as (meth)acrylic acid, methyl (meth)acrylate, ethyl (meth)acrylate, butyl (meth)acrylate, hexylacrylate, 2-ethylhexyl(meth)acrylate, isoctyl(meth)

acrylate, 2-hydroxymethyl(meth)acrylate, 2-hydroxypropyl (meth)acrylate, N,N'-dimethylaminoethyl(meth)acrylate, N,N'-diethylaminoethyl(meth)acrylate, glycidyl(meth) acrylate, carbitol acrylate, isobornyl acrylate, styrene, acrylonitrile, vinyl acetate and vinyl toluene.

The difunctional monomers include e.g. 1,6-hexane diol (meth)acrylate, neopentyl glycol di(meth)acrylate, ethylene glycol di(meth) acrylate, polyethylene glycol di(meth) acrylate, polypropylene glycol di(meth)acrylate, butylene glycol di(meth)acrylate, pentaerythritol diacrylate and 1,4-butane diol diacrylate.

The polyfunctional monomers include e.g. trimethylol propane tri(meth)acrylate, pentaerythritol triacrylate, dipentaerythritol hexacrylate, tetramethylol methane tetraacrylate and N,N,N',N'-tetrakis($\beta$-hydroxyethyl)ethyl diamine acrylate.

The allyl monomers include e.g. diallyl phthalate, diallyl isophthalate and diallyl adipate.

These can be used alone or in combination thereof.

The monomer can be added in an amount of 0 to 400 parts by weight relative to 100 parts by weight of the photo-curing oligomer. This is because if the amount exceeds 400 parts by weight, the physical properties of the resulting coating film, such as coating abrasion resistance, chemical resistance and weatherability, may be deteriorated.

The additive described above includes sensitizers, coloring matter, defoaming agents, wetting agents, leveling agents, viscosity regulators, storage stabilizers, anti-fungus agents, anti-slip agents, coating cracking preventing agents, adhesion promoters, dispersants, surface active agents and extender pigments. Any of these may be known ones.

The floor covering onto which said coating composition is applied includes e.g. plastics, wooden materials, ceramics, stone materials, concrete and metals. More specifically, as the plastics there are composition vinyl floor tiles, homogenous vinyl floor tiles, composite floor tiles, rubber floor tiles, vinyl floor sheets having no foaming layer, vinyl floor sheets having a foaming layer, cushion floors, linoleum floor covering and vinyl chloride. As the wooden materials, there are single-ply flooring, composite flooring, deck plates, cork tiles, wooden blocks and poured floor covering. As the ceramics, there are ceramic tiles, porcelain tiles, china tiles, ceramic blocks and non-slip tiles. As the stone materials, there are granite, marble and terrazzo tiles. As the concrete, there is e.g. mortar.

The coating composition described above forms a coating film with which the surface of floor covering is coated. As the process for producing a floor surface-coated body having such a coating film, there is a process for producing a floor surface-coated body which comprises the step of applying said coating composition onto the surface of floor covering and the step of irradiating said coating composition with light to cure it.

The coating composition is composed of the composition described above and thus can, upon photo-curing, form a coating film excellent in gloss retention performance.

Prior to application of said coating composition onto the surface of floor covering, a resin film for sealer is preferably formed thereon. Because the resin film for sealer inhibits the penetration of the coating composition into the surface of floor covering, the thickness of a dried coating of the coating composition can be accurately regulated. In particular, it is of deep significance to form the resin film for sealer on floor covering such as wooden materials into which the coating composition easily penetrates.

If the floor covering into which the coating composition easily penetrates is directly coated, without forming the resin film for sealer thereon, with the coating composition, then the complete curing of the coating composition which penetrated deeply into the inside of the floor material is difficult even upon irradiation with light for a long time, and further the green coating composition may ooze with time.

The resin film for sealer can make use of resins ordinarily used as coatings for sealer, such as those based on urethane, acrylate, epoxy or vinyl acetate, which may be in any form of an organic or aqueous solution, an aqueous emulsion or an aqueous dispersion.

The resin film for sealer can be dried by any usual method of drying coatings, such as photo-curing, spontaneous drying or hot-air drying, and a drying method capable of being effected in a short time and hardly causing deterioration of the resin film with radiation is preferably used.

Curing of resin in the resin film for sealer is conducted preferably before application of the coating composition. By doing so, the penetration of the coating composition into the surface of floor covering is prevented.

The thickness of the resin film for sealer can be arbitrarily selected depending on various functions required of floor surface. The thickness of film is preferably the one preventing the coating composition from penetrating into the inside of floor covering and permitting the coating film to demonstrate the required performance.

The light with which the coating composition is irradiated includes UV rays from a high-pressure mercury lamp, a metal halide lamp etc. The intensity of irradiation on the surface to be irradiated is preferably 1 to 5000 mJ/cm$^2$. If it is less than 1 mJ/cm$^2$, the curing rate of the photo-curing oligomer is decreased, while if it exceeds 5000 mJ/cm$^2$, a longer irradiation is necessary where facilities with low irradiation performance are used, and if the irradiation in a short time is desired, facility costs are increased and the coating film may be deteriorated. More preferably, it is 10 to 3000 mJ/cm$^2$.

Other light with which the coating composition is irradiated may be visual light from a halogen lamp, a xenon lamp etc. or sunlight, but a light of short wavelength including UV rays is preferable to attain efficient curing.

The thickness of a dried coating of the coating composition is at least 4 $\mu$m or more, preferably 7 $\mu$m or more and more preferably 11 $\mu$m or more. If it is less than 4 $\mu$m, the initial gloss of the resulting coating film may be low, and if it is less than 7 $\mu$m, the gloss of the resulting coating film may be lowered when a tarnished part of the coating film may be removed by e.g. polishing. Further, if it is less than 11 $\mu$m, the gloss of the coating film may be lowered when a tarnished part of the coating film is removed by e.g. repeatedly polishing the surface of the coating film.

The thickness of a dried coating of the coating composition is preferably 200 $\mu$m or less. If it exceeds 200 $\mu$m, the coating operation requires a longer time, the time necessary for drying the coating film and the intensity of irradiation necessary for curing should be increased, and the cracking and warping of the floor covering may occur due to shrinkage of the coating film.

The floor face-coated body obtained by the process described above is for example a floor surface-coated body having the surface of floor covering coated with a coating film, wherein the coating film is formed by photo-curing a coating composition comprising a photo-curing oligomer wherein the average number of functional groups per molecule thereof is 4 or more and a photo-initiator.

Because the above coating film is prepared by photo-curing the coating composition described above, it is excellent in gloss retention performance as described above.

The thickness of the coating film is preferably the same as the thickness of a dried coating of the coating composition.

As a method of forming a resin coating film by use of the coating composition described above, there is for example a composite film for forming a resin coating film on the surface of floor covering, wherein the composite film comprises a resin coating film provided at the side of adhering to the floor covering, a substrate sheet provided at the opposite side to the side of adhering to the floor covering, and a coating composition applied in contact with the substrate sheet, said coating composition being the coating composition defined above.

The composite film is cured after the side of the resin coating film therein is allowed to adhere to the surface of floor covering, and then the substrate sheet is removed. The resin coating film is formed on the surface of the floor covering, and a coating film made of the cured coating composition is formed on said resin coating film. The coating film is excellent in gloss retention performance as described above, and thus the gloss of the resin coating film is durable and maintained for a long time. Therefore, the resin coating film maintaining gloss for a long time can be formed using the composite film described above.

The resin coating film is preferably a water-soluble resin which can be dissolved in water before curing. Because water can be used as the solvent, it is not necessary to use an organic solvent, and upon drying, the environment is not polluted and the coating operation is facilitated. As the water-soluble resin, there are resins based epoxy, acrylate, acrylic urethane, urethane and vinyl acetate.

The resin coating film comprises a water-soluble resin layer provided at the side of the surface of floor covering and a water-insoluble resin layer provided at the opposite side to the surface of the floor covering, wherein the water-soluble resin layer is preferably the one which can be dissolved in water before curing and contains a vinyl group-containing reactive compound and polyvinyl alcohol. The water resistance and adhesiveness of the resin coating film are thereby improved. Further, the water-insoluble resin layer can be formed from the coating composition.

The vinyl group-containing reactive compound includes acrylic, unsaturated (meth)acrylic, unsaturated polyester, alkyd and epoxy type compounds.

EXAMPLES

Example 1

In this example, a coating composition using one kind of photo-curing oligomer was prepared and used to form a coating film, and its gloss retention performance was evaluated.

First, 2 parts by weight of a photo-initiator Darocure 1173 (CHIBA GEIGY (JAPAN)) was added to 100 parts by weight of each of photo-curing oligomers having a different average number of functional groups per molecule to prepare each coating composition for floor covering. The photo-curing oligomers were urethane type (samples 1 to 12), polyester type (samples 13 to 17), epoxy type (sample 18) and polyether type (samples 19 to 23), as shown in Table 1.

Then, each coating composition was applied by an applicator onto a polyester decorative sheet previously polished with #400 sand paper to give a coating with an average thickness of 20 $\mu$m after drying. Those organic photo-curing oligomers having high viscosity were used after dilution with butyl acetate so as to be applicable by the applicator. After left for 1 hour or more, each sample was irradiated with a light at an intensity of 2700 mJ/cm$^2$ from a high-pressure mercury lamp (H05-L21; Eye Graphics Co., Ltd.). A coating film made of each coating composition was thereby formed on the polyester decorative sheet.

Then, the gloss retention performance of each coating film was evaluated.

For evaluation, a metal mass with a load of 1200 g/cm$^2$ was placed via silica sand No. 8 on the surface of the coating film, and the metal mass was reciprocated thereon 40 times. Gloss retention performance was evaluated in terms of a difference in surface gloss before and after the test (measurement angle: 60°). The surface gloss was measured using a gloss checker (trade name: IG-330) from Horiba Seisakusho, Japan.

A smaller difference in surface gloss is indicative of higher gloss retention performance of coating film. In general, it is desired that surface gloss is in the range of 40 to 90. The surface of the coating film on which the metal mass has been reciprocated 40 times corresponds to the surface of floor covering after 3 months in a shop where persons' comings and goings is significant.

Figure 1:
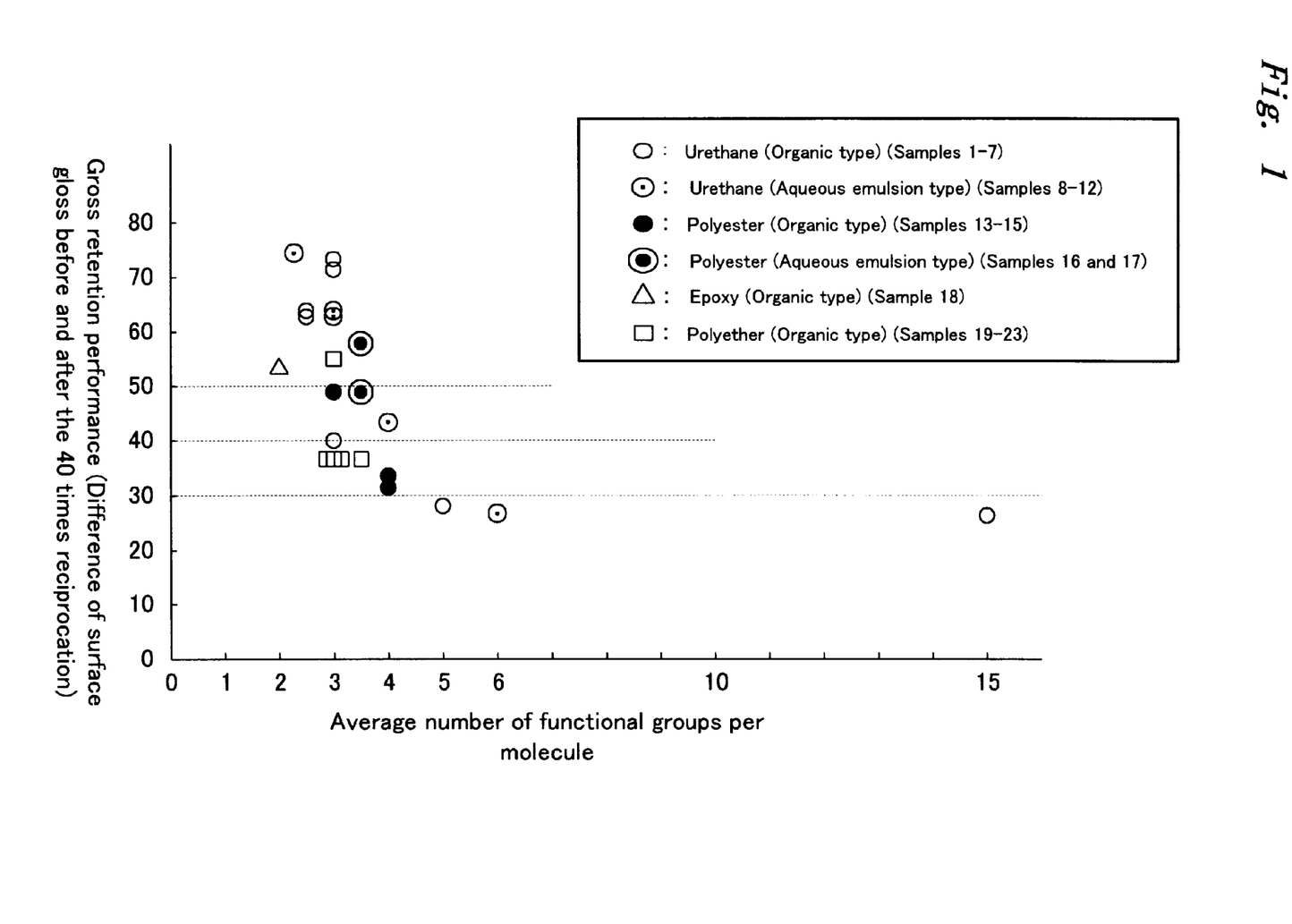
FIG. 1 is a characteristic graph showing the relationship between the average number of functional groups per molecule of the photo-curing oligomer and the gloss retention performance of the coating film in Example 1.

The initial surface gloss of any coating film before the test was 90±10. The difference in surface gloss before and after the test is shown in FIG. 1 and Table 1.

From the measurement results, the difference in the surface gloss of each coating film is related closely to the average number of functional groups per molecule of the photo-curing oligomer, and it can be seen that if the average number of functional groups per molecule is approximately (4±1), (5±1) and (6±1), then the difference in surface gloss is about 40, 30, and less than 30, respectively. If the difference in surface gloss is 40, 30, and less than 30, then the surface gloss after the test is 50, 60, and more than 60, respectively.

A smaller difference in surface gloss is indicative of higher gloss retention performance. In general, surface gloss itself is preferably in the range of 50 to 90, more preferably 60 to 90.

TABLE 1

| Sample | Photo-curing oligomer (Trade name) | Average number of functional groups per molecule | Manufacturer | Type of resin | Type | Difference of surface gloss |
|---|---|---|---|---|---|---|
| 1 | UNIDIC V-4260 | 3 | Dainippon Ink | Urethane | Organic | 40 |
| 2 | UNIDIC V-4299 | 3 | Dainippon Ink | Urethane | Organic | 73 |
| 3 | UNIDIC V-4391 | 2.5 | Dainippon Ink | Urethane | Organic | 64 |
| 4 | UNIDIC V-4392 | 2.5 | Dainippon Ink | Urethane | Organic | 63 |
| 5 | UNIDIC 17-806 | 5 | Dainippon Ink | Urethane | Organic | 28 |
| 6 | UNIDIC C7-113 | 3 | Dainippon Ink Shin Nakamura | Urethane | Organic | 71 |

TABLE 1-continued

| Sample | Photo-curing oligomer (Trade name) | Average number of functional groups per molecule | Manufacturer | Type of resin | Type | Difference of surface gloss |
|---|---|---|---|---|---|---|
| 7 | U-15HA | 15 | Kagaku | Urethane | Organic | 26 |
| 8 | Viaktin VTE6165W | 3 | Clarient Japan | Urethane | Aqueous emulsion | 64 |
| 9 | Viaktin VTE6155W | 3 | Clarient Japan | Urethane | Aqueous emulsion | 63 |
| 10 | Laromer LR8949 | 2.2 | BASF | Urethane | Aqueous emulsion | 74 |
| 11 | Beam set EM-90 | 6 | Arakawa Kagaku | Urethane | Aqueous emulsion | 27 |
| 12 | Beam set EM-92 | 4 | Arakawa Kagaku | Urethane | Aqueous emulsion | 43 |
| 13 | Ebecryl 80 | 4 | Daiseru UCB | Polyester | Organic | 31 |
| 14 | ARONIX TO-1343 | 4 | Toagosei | Polyester | Aqueous soluble organic | 33 |
| 15 | ARONIX TO-1321 | 3 | Toagosei | Polyester | Aqueous soluble organic | 49 |
| 16 | Laromer PE55W | 3.5 | BASF | Polyester | Aqueous emulsion | 58 |
| 17 | Laromer LR8895 | 3.5 | BASF | Polyester | Aqueous emulsion | 49 |
| 18 | Ebecryl 600 | 2 | Daiseru UCB | Epoxy | Organic | 53 |
| 19 | Laromer LR8945 | 2.9 | BASF | Polyether | Organic | 37 |
| 20 | Laromer LR8812 | 3.5 | BASF | Polyether | Organic | 37 |
| 21 | Laromer LR8864 | 3 | BASF | Polyether | Organic | 55 |
| 22 | Laromer LR8869 | 3 | BASF | Polyether | Organic | 37 |
| 23 | Laromer LR8946 | 3.2 | BASF | Polyether | Organic | 37 |

Example 2

In this example, two kinds of photo-curing oligomers were used to form a coating film on the surface of floor covering and evaluated for gloss retention performance.

First, two kinds of urethane-based photo-curing oligomers were prepared. These were different from each other in the average number of functional groups per molecule as calculated using their average molecular weights. These two kinds of urethane-based photo-curing oligomers were mixed at a suitable ratio as shown in Table 2 to give samples 24 to 29. Two parts by weight of a photo-initiator Darocure 1173 (CHIBA GEIGY (JAPAN)) were added to 100 parts by weight of each sample.

As necessary, 0 to 30 parts by weight of butyl acetate was added as diluent. Each coating composition was thus prepared.

Figure 2:
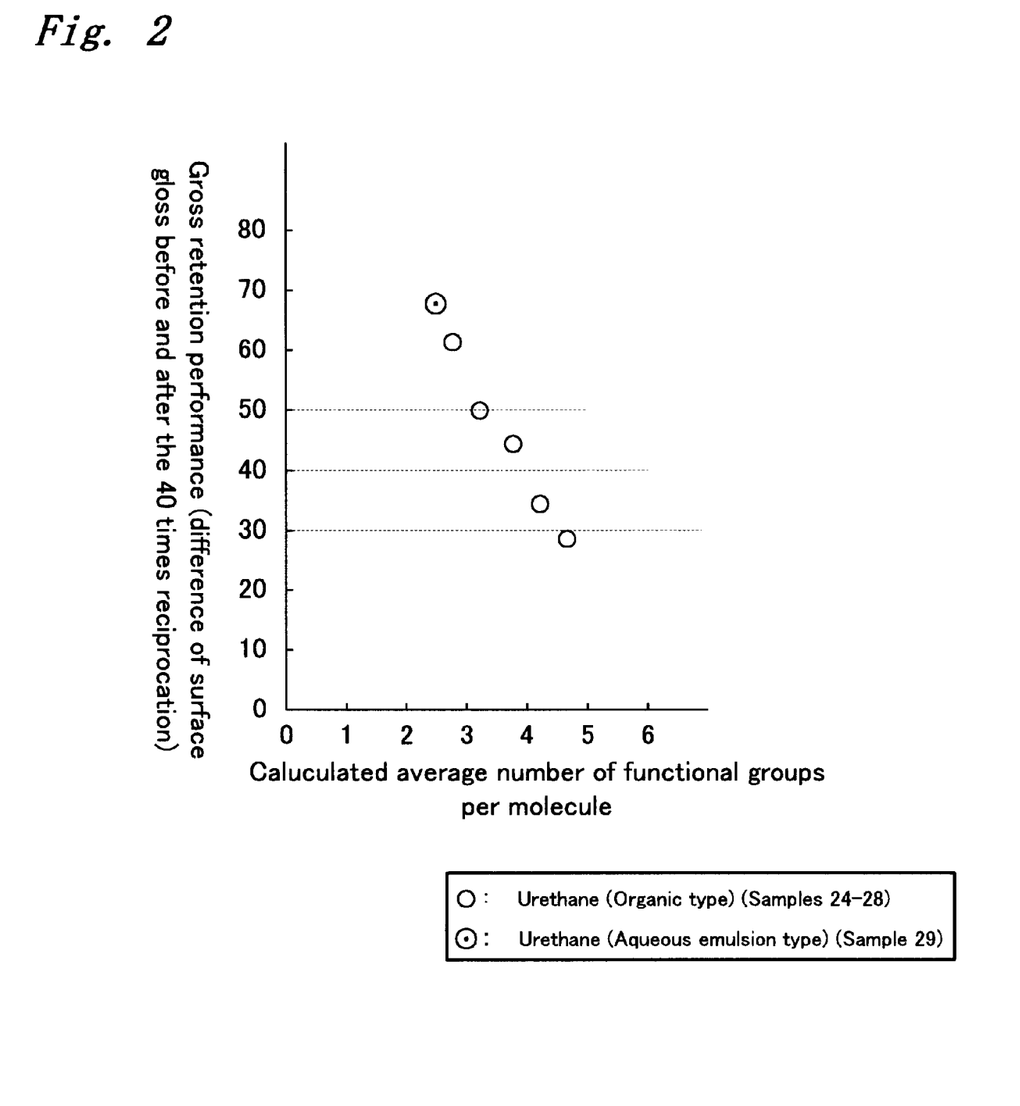
FIG. 2 is a characteristic graph showing the relationship between the average number of functional groups per molecule of the photo-curing oligomer and the gloss retention performance of the coating film in Example 2.

Then, each coating composition was applied by an applicator in the same manner as in Example 1 onto a polyester decorative sheet previously polished with #400 sand paper to give a coating film with an average thickness of 20 μm after drying. The gloss retention performance of the coating film was evaluated in the same manner as in Example 1. The evaluation results are shown in FIG. 2 and Table 2.

From the measurement results, if the average number of functional groups per molecule, as calculated using the average molecular weight, was approximately (4±1) and (5±1), then the difference in surface gloss was about 40 and 30, respectively. The difference in surface gloss of the coating film where 2 kinds of photo-curing oligomers were used is related closely to the average number of functional groups per molecule of each photo-curing oligomer as calculated using the average molecular weight, and this relationship is the same as in the case where 1 kind of photo-curing oligomer was used such as Example 1.

A smaller difference in surface gloss is indicative of higher gloss retention performance. In general, surface gloss itself is preferably in the range of 50 to 90, more preferably 60 to 90.

TABLE 2

| Urethane (organic type) photo-curing oligomer (trade name) | UNIDIC17-806 | UNIDICV-4391 | NeoRadR-445* | Calculated average number of functional groups per molecule | Difference of surface gloss |
|---|---|---|---|---|---|
| Average number of functional groups per molecule | 5 | 2.5 | | | |
| Average number of molecular weight | 800 | 800 | | | |
| Sample 24 | 90 parts by weight | 10 parts by weight | | 4.8 | 29 |
| Sample 25 | 70 parts by weight | 30 parts by weight | | 4.3 | 34 |
| Sample 26 | 50 parts by weight | 50 parts by weight | | 3.8 | 45 |
| Sample 27 | 30 parts by weight | 70 parts by weight | | 3.3 | 50 |
| Sample 28 | 10 parts by weight | 90 parts by weight | | 2.8 | 61 |

TABLE 2-continued

| Urethane (organic type) photo-curing oligomer (trade name) | UNIDIC17-806 | UNIDICV-4391 | NeoRadR-445* | Calculated average number of functional groups per molecule | Difference of surface gloss |
|---|---|---|---|---|---|
| Sample 29 | | | 100 parts by weight | 2.5 | 68 |

*Composition of two kinds of photo-curing oligomers wherein average number of functional groups per molecule is 2 or 3

Example 3

In this example, the relationship between the number average molecular weight of the photo-curing oligomer per functional group and the gloss retention performance was examined.

Figure 3:
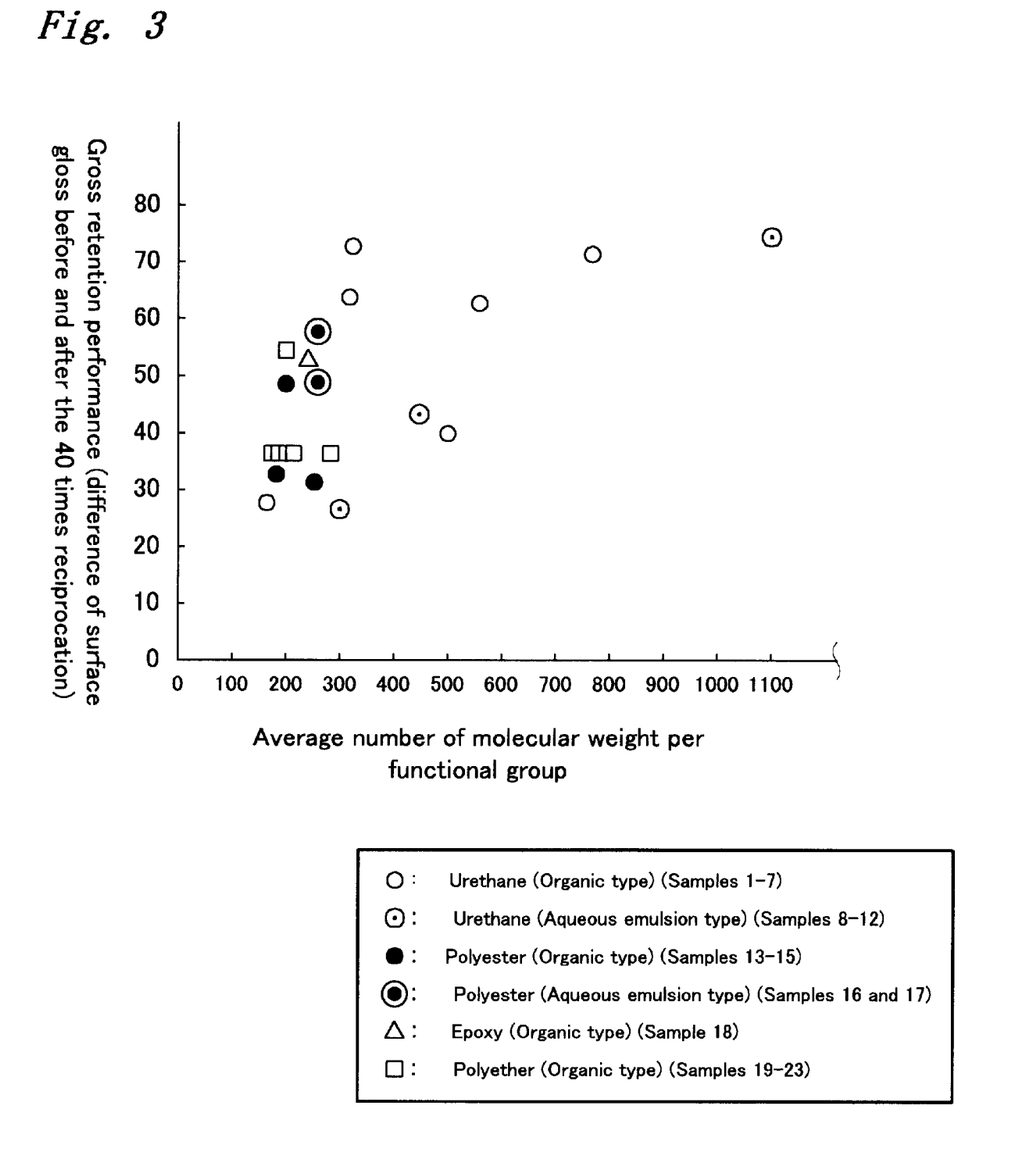
FIG. 3 is a characteristic graph showing the relationship between the average number of functional groups per molecule of the photo-curing oligomer and the gloss retention performance of the coating film in Example 3.

The number average molecular weight of each of photo-curing oligomers (samples 1 to 23) used in Example 1 per functional group was examined. In FIG. 3, the number average molecular weight was plotted in the X axis, while the difference in surface gloss as the evaluation result in Examples 1 and 2 was plotted in the Y axis.

As can be seen from FIG. 3, there was the tendency that the gloss retention performance of the coating film is raised with a decrease in the number average molecular weight of the photo-curing oligomer per functional group. For example, in light of the number average molecular weight of 300 per functional group, its corresponding gloss retention performance is as very broad as 67 to 27, and it cannot be said that the number average molecular weight of 300 per functional group is preferable.

On the other hand, as can be seen from the result in FIG. 1 in Example 1, the gloss retention performance is as narrow as 27 or so when the average number of functional groups per molecule is 6, and the average number of functional groups per molecule may be 6.

From the foregoing, it can be seen that the gloss retention performance of the coating film is hardly influenced by the number average molecular weight per functional group.

A large number of modifications and alternations of the present invention are feasible in light of the techniques described above. Accordingly, it is understood that the present invention can be carried out within the scope of the appended claims in a different means from those particularly described herein.

What is claimed is:

1. A coating composition applied onto the surface of floor covering, comprising a photo-curing oligomer and a photo-initiator wherein the average number of functional groups per molecule of the photo-curing oligomer is 4 or more.

2. The coating composition according to claim 1, wherein the average number of functional groups per molecule of the photo-curing oligomer is 5 or more.

3. The coating composition according to claim 1, wherein the average number of functional groups per molecule of the photo-curing oligomer is 6 or more.

4. The coating composition according to claim 1, wherein the photo-curing oligomer is an aqueous emulsion system and/or an aqueous dispersion system.

5. A process for producing a floor surface-coated body, which comprises the step of coating the surface of floor covering with a coating composition comprising a photo-curing oligomer wherein the average number of functional groups per molecule thereof is 4 or more and a photo-initiator, and the step of irradiating the coating composition with light to cure it.

6. The process for producing the floor surface-coated body according to claim 5, which comprises forming a resin film for sealer on the surface of floor covering prior to the coating thereof with the coating composition.

7. A floor surface-coated body having the surface of floor covering coated with a coating film, wherein the coating film is formed by photo-curing a coating composition comprising a photo-curing oligomer wherein the average number of functional groups per molecule thereof is 4 or more and a photo-initiator.

8. A composite film for forming a resin coating film on the surface of floor covering, wherein the composite film comprises a resin coating film provided at the side of adhering to the floor covering, a substrate sheet provided at the opposite side to the side of adhering to the floor covering, and a coating composition applied in contact with the substrate sheet, said coating composition comprising a photo-curing oligomer and a photo-initiator wherein the average number of functional groups per molecule of the photo-curing oligomer is 4 or more.

* * * * *

UNITED STATES PATENT AND TRADEMARK OFFICE
CERTIFICATE OF CORRECTION

PATENT NO.    : 6,372,340 B1
DATED         : April 16, 2002
INVENTOR(S)   : Tominaga et al.

Page 1 of 1

It is certified that error appears in the above-identified patent and that said Letters Patent is hereby corrected as shown below:

<u>Title page,</u>
Item [73], the Assignee information is incorrect. Item [73] should read as follows:
-- [73]  Assignee:  GEN Maintenance Technology Inc.,
                    Tsushima (JP) --

Signed and Sealed this

Nineteenth Day of November, 2002

Attest:

Attesting Officer

JAMES E. ROGAN
*Director of the United States Patent and Trademark Office*